United States Patent [19]

Stephenson et al.

[11] Patent Number: 4,747,232
[45] Date of Patent: May 31, 1988

[54] VEHICLE FRAMELESS DOOR WINDOW STABILIZER

[75] Inventors: Randy L. Stephenson, Brighton; Larry A. Lohr, Howell, both of Mich.

[73] Assignee: Cars & Concepts, Inc., Brighton, Mich.

[21] Appl. No.: 892,804

[22] Filed: Aug. 1, 1986

[51] Int. Cl.$^4$ ............................................. E05D 13/00
[52] U.S. Cl. ........................................ 49/452; 49/376; 49/502
[58] Field of Search ................. 49/376, 452, 502, 348; 254/389

[56] References Cited

U.S. PATENT DOCUMENTS

| | | | |
|---|---|---|---|
| 2,361,608 | 10/1944 | Doty | 49/376 |
| 2,449,210 | 9/1948 | Faust | 49/452 |
| 2,797,128 | 6/1957 | Renno | 49/502 |
| 3,379,162 | 4/1968 | Chatten et al. | 254/389 |
| 4,432,167 | 2/1984 | Watanuki | 49/502 |

Primary Examiner—Kenneth J. Dorner
Assistant Examiner—Gerald A. Anderson
Attorney, Agent, or Firm—Brooks & Kushman

[57] ABSTRACT

A stabilizer (24) for a vehicle side door window (16) includes a molded plastic stabilizer member (26) having a vertical groove (28) that receives a vertical window edge to control the path of window movement and window positioning in an upper closed position. An adjustable connection (30) of the stabilizer (24) permits inboard and outboard adjustment of the location of the top edge (22) of the window (16) in order to provide effective sealing. The stabilizer member (26) is preferably mounted on a front projection (34) of the associated vehicle door (14) and stabilizes the front window edge (18). A mounting bracket (48) associated with the adjustable connection (30) cooperates in providing the mounting of the stabilizer member (26) on the front door projection (34) and has stop flanges (80) and (82) that limit the extremes of adjustment. The groove (28) of the stabilizer member (26) converges in an upward direction to provide slidable engagement of both glass surfaces with the upper end of the stabilizer in order to increase the stability provided.

13 Claims, 3 Drawing Sheets

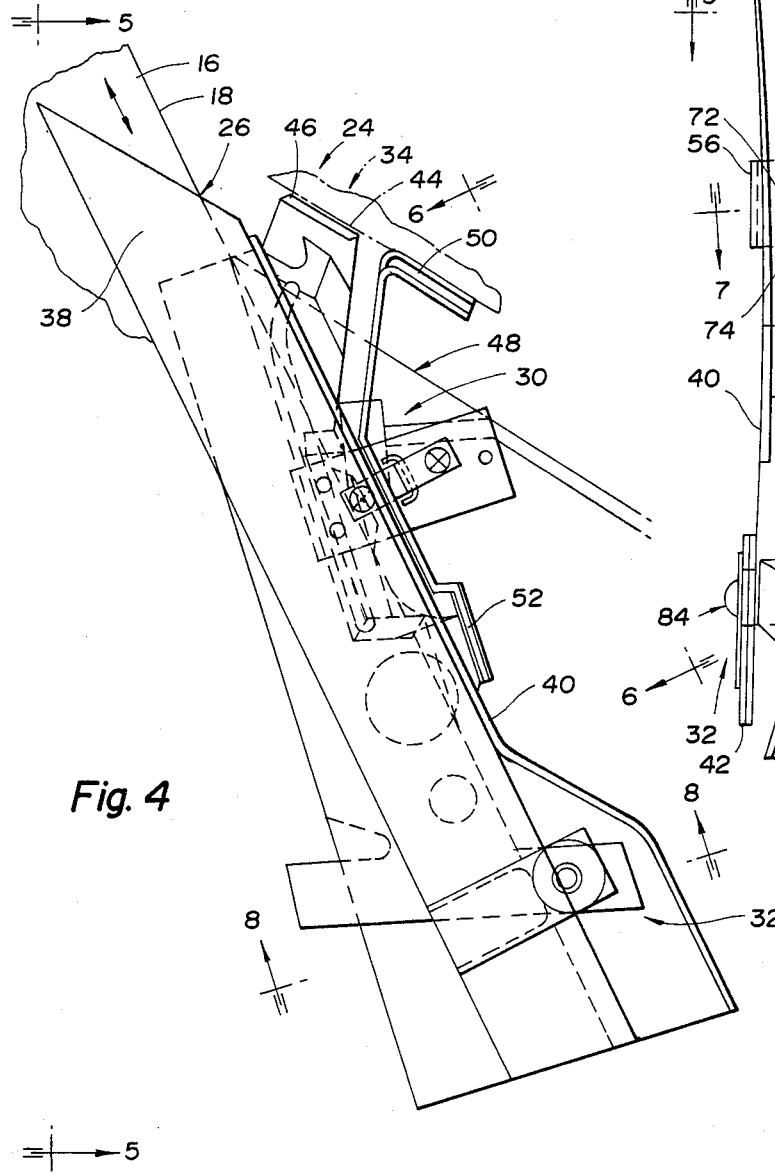
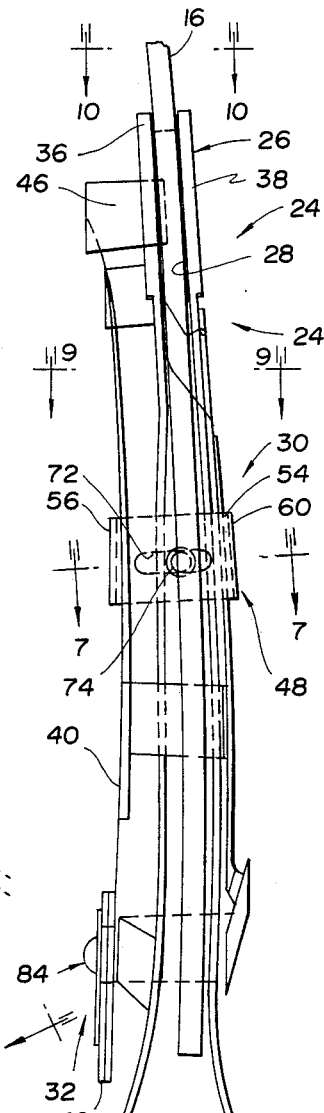

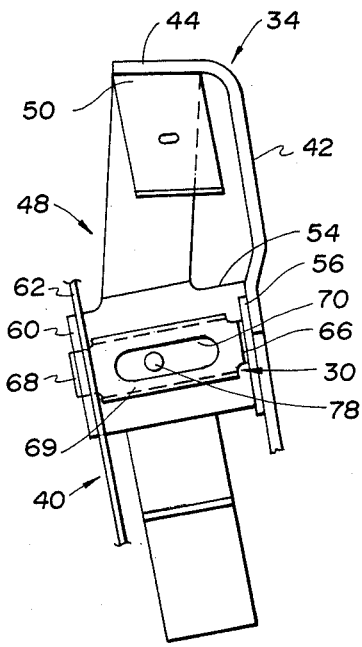
Fig. 6
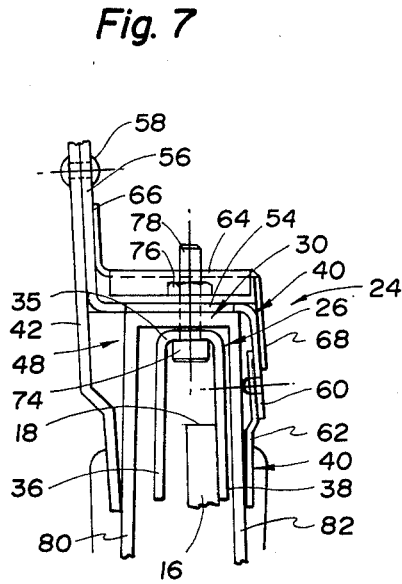
Fig. 7
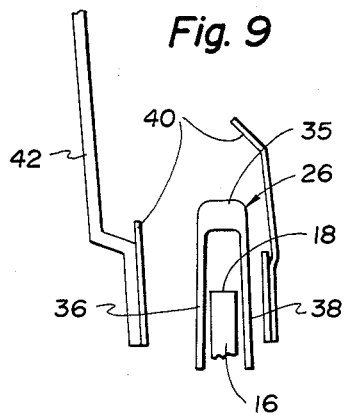
Fig. 9
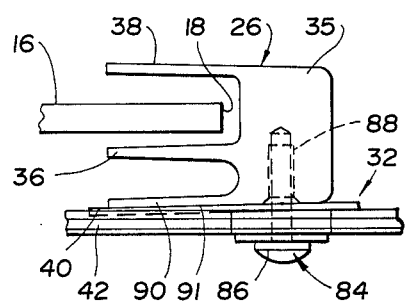
Fig. 8
Fig. 10

VEHICLE FRAMELESS DOOR WINDOW STABILIZER

TECHNICAL FIELD

This invention relates to a stabilizer for a frameless side door window of a vehicle.

BACKGROUND ART

Most vehicle side doors include a window that is movable vertically between a lower open position and an upper closed position while passing through partially open positions of varying extents. Such window movement is normally controlled by either a manual or power operated window regulator. With many sedan type vehicles, the side door has a frame that defines a window opening corresponding to the perimeter of the side door window at its front, top, and rear edges. Such window frames conventionally have a groove that receives the front, top, and rear edges of the window to provide positioning of the window in the upper closed position. Vehicle side doors without window frames are also manufactured for use with hardtop, convertible, T-top, and other vehicle designs wherein it is desirable not to have any window frame.

U.S. Pat. Nos. 4,399,600 and 4,567,636 disclose vehicle door conversion that permits a vehicle door of the type having a window frame to be converted to a frameless type door. Such conversion greatly enhances manufacturing flexibility by permitting vehicles of both the framed and frameless side door window type to be manufactured on the same assembly line with a station where window frame removal is performed depending upon which type of vehicle is desired.

Vehicle body designs for the past twenty years or so have incorporated side door windows having "tumble-home", which is inboard curvature in an upward direction above the side door in which the window is stored in the lower open position. Such tumble-home curvature makes sealing of frameless side door windows more difficult since it is not as easy to control the location of the top edge of the window as can be done with framed side door windows. This is especially true when the side door is of the frameless type converted from a frame type wherein the window regulator mechanism is designed to cooperate with the window frame in positioning the window in the upper closed position.

DISCLOSURE OF INVENTION

A window stabilizer of the present invention is incorporated in a vehicle including a side door opening and a side door for opening and closing the door opening. The side door includes a frameless type door window movable vertically between open and closed positions by any conventional type of window regulator. This side door window has front and rear vertical edges and a top edge extending between the front and rear vertical edges.

The window stabilizer of the present invention includes a molded plastic stabilizer member having a vertical groove that slidably receives one of the vertical edges of the side door window to control the path of movement and positioning thereof in the closed position. An adjustable connection of the stabilizer supports the stabilizer member on the door while permitting adjustment to control the horizontal position of the top edge of the window in the closed position. Such positioning of the window facilitates sealing thereof with the associated side door opening even when the window is of the type having tumble-home curvature that makes sealing more difficult.

In the preferred construction, the window stabilizer also includes a mounting connection that supports the stabilizer member on the door in cooperation with the adjustable connection and permits pivotal movement of the stabilizer member upon adjustment of the adjustable connection to control positioning of the side door window. The groove of the stabilizer member converges in an upward direction and has an upper end that tapers away from the vertical edge of the side door window received by this groove. This construction permits the upper end of the groove to slidably engage the oppositely facing surfaces of the vertical window edge received by the groove so as to thereby enhance the stability provided to the side door window.

The side door window also preferably includes a front projection that extends upwardly and supports the stabilizer member whose groove slidably receives the front vertical edge of the side door window. The mounting connection is preferably supported on the front projection of the door below the adjustable connection such that the pivoting of the stabilizer member takes place about a lower axis upon adjustment of the adjustable connection.

In the preferred construction disclosed, the front projection of the door includes a mounting bracket to which the adjustable connection is attached. This adjustable connection preferably includes a slot and threaded bolt that extend between the mounting bracket and the stabilizer member to provide the adjustment capability. A pair of stop flanges of the mounting bracket are located on opposite sides of the bolt and slot of the adjustable connection to limit the extremes of adjustment of the stabilizer member.

The mounting connection of the stabilizer preferably includes a threaded fastener that extends between the stabilizer member and the front projection of the door. With the preferred construction wherein the mounting connection is located below the adjustable connection, the small amount of pivoting necessary to provide effective window sealing is possible with a head of the threaded fastener of the mounting connection engaged with a vertical wall of the front projection of the door and with a threaded shank of the threaded fastener extending into a threaded hole of the stabilizer member.

The objects, features, and advantages of the present invention are readily apparent from the following description of the best mode for carrying out the invention when taken in connection with the accompanying drawings.

BRIEF DESCRIPTION OF DRAWINGS

FIG. 4 is a view of the stabilizer taken in the same direction as FIG. 2 but with an enlarged scale;

FIG. 5 is a rear view of the stabilizer taken along the direction of line 5—5 in FIG. 4;

FIG. 6 is a view of a mounting bracket of the stabilizer taken along the direction of line 6—6 in FIG. 4;

FIG. 7 is a sectional view taken through an adjustable connection of the stabilizer along the direction of line 7—7 in FIG. 5;

FIG. 8 is a sectional view taken through the stabilizer along the direction of line 8—8 in FIG. 4;

FIG. 9 is a sectional view taken through the stabilizer along the direction of line 9—9 in FIG. 5; and FIG. 10 is a sectional view taken through the stabilizer along the direction of line 10—10 in FIG. 5.

BEST MODE FOR CARRYING OUT THE INVENTION

Figure 1:
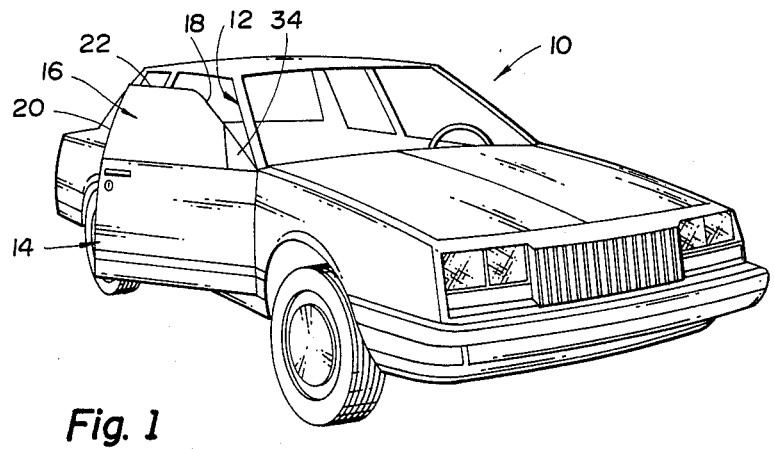
FIG. 1 is a perspective view of a vehicle including a side door having a window stabilizer constructed in accordance with the present invention.

With reference to FIG. 1 of the drawings, a vehicle generally indicated by 10 is of the conventional type including a side door opening 12 and a side door 14 for opening and closing the door opening by movement about a generally vertical axis adjacent its forward end. The side door 14 includes a frameless type door window 16 that is movable vertically between the upper closed position shown and a lower open position where the window is located within the door. Side door window 16 has front and rear vertical edges 18 and 20 and a top edge 22 extending between the front and rear vertical edges. Upon movement of the door 14 to the closed position, the window edges 18, 20, and 22 engage a seal that extends about the associated side door opening 12 in a conventional manner.

With combined reference to FIGS. 4 and 5, the present invention is embodied by a window stabilizer 24 for the side door window 16. This window stabilizer 24 includes a molded plastic stabilizer member 26 having a vertical groove 28 that slidably receives one of the vertical edges of the side door window as also shown in FIGS. 7 through 10. As such, the stabilizer member 26 controls the path of movement and positioning of the side door window 16 in the closed position. An adjustable connection 30 of the window stabilizer supports the stabilizer member on the door as is hereinafter more fully described while permitting adjustment to control the horizontal positioning of the top edge of the window in the closed position.

Adjustment of the adjustable connection 30 shown in FIGS. 4 and 5 allows the side door window 16 to be adjusted to position the window edges for sealing about the entire periphery of the side door opening 12 illustrated in FIG. 1. Such adjustment is particularly advantageous when the door window has a "tumble-home" curvature in an inboard direction upwardly in accordance with current vehicle designs.

Also, it should be appreciated that the window stabilizer of this invention can be utilized with any type of vehicle side door having a frameless type window regardless of the type of vehicle on which the door is mounted. Thus, the window stabilizer can be utilized on hardtops, convertibles, T-tops, single roof openings that extend the entire width of the vehicle roof between front and rear roof portions, and other types of specialty manufactured vehicles.

As shown in FIGS. 4, 5, and 8, the window stabilizer also preferably includes a mounting connection 32 that supports the stabilizer member 26 on the door in cooperation with the adjustable connection 30 shown in FIGS. 4 and 5. This mounting connection 32 permits pivotal movement of the stabilizer member upon adjustment of the adjustable connection 30. The pivotal movement is about a horizontal axis that extends longitudinally with respect to the door and thus controls lateral positioning of the side door window at its front, rear, and top edges.

Figure 2:
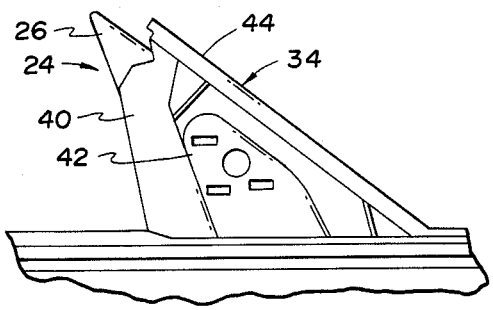
FIG. 2 is a partial view of the vehicle side door looking in an inboard direction toward a front projection on which a stabilizer member of the stabilizer is mounted.
Figure 3:
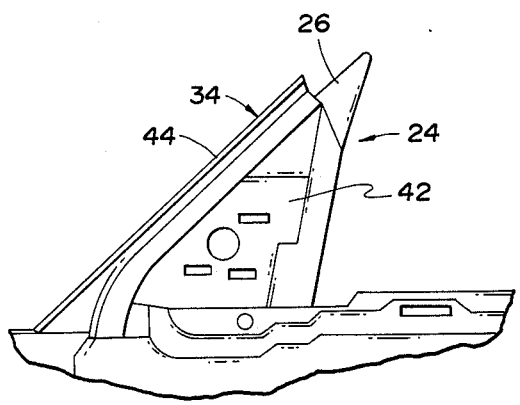
FIG. 3 is a partial view of the vehicle side door looking in an outboard direction at the front projection.

As shown in FIGS. 1, 2, and 3, the side door 14 is disclosed as including a front projection 34 that extends upwardly and supports the stabilizer member 26 whose groove thus slidably receives the front vertical edge 18 of the side door window. However, it should be appreciated that the stabilizer can also be adapted to receive the rear vertical edge 20 of the side door window 16 and still function in accordance with the invention even though the frontal location and operation is preferred. Also, as is hereinafter more fully described, the mounting connection 32 shown in FIG. 4 is supported on the front projection 34 of the door below the adjustable connection 30 such that the upper end of the stabilizer member 26 pivots inwardly and outwardly about its lower end during the adjustment.

As shown in FIGS. 5 and 10, the stabilizer member 26 has a base wall 35 from which inner and outer walls 36 and 38 extend to define the vertical groove 28 that receives the front window edge 18. This vertical groove 28 converges in an upward direction as shown in FIG. 5. These inner and outer walls 36 and 38 at the upper end of the stabilizer member 26, as shown in FIG. 10, taper horizontally away from the vertical edge of the window 16 received by the groove 28, i.e. the walls 36 and 38 taper forwardly from the front window edge 18 in the construction shown. As such, the spaced inner and outer walls 36 and 38 slidably engage both oppositely facing surfaces of the window edge 18 at the upper end of the stabilizer member. This slidable engagement between the stabilizer member walls 36 and 38 and the window 16 enhances the stability of the window to thereby prevent noise during vehicle travel and the possibility of leakage of the closed window.

As best illustrated in FIGS. 4 and 5, the front door projection 34 has a bent metal support 40 that is preferably made from sheet metal by a stamping operation. This bent sheet metal support 40 is secured to a vertical wall 42 of the front door projection 34 on the outboard side of the wall as shown in FIG. 2. The support 40 extends upwardly from the door to an inclined bent metal wall 44 of the door projection at which a flange 46 (FIG. 4) of the support 40 is secured in any suitable manner such as by welding, a threaded fastener, or a rivet connection.

With reference to FIGS. 4 through 7, a mounting bracket 48 of the window stabilizer extends between the support 40 and the vertical and inclined walls 42 and 44 of the door projection 34 and has the adjustable connection 30 attached thereto in order to provide the adjustable positioning of the plastic window stabilizer member 26. Specifically, the mounting bracket 48 has a flange 50 that is secured as shown in FIG. 4 in a suitable manner to the inclined wall 44 of the door projection 34. A lower flange 52 of the mounting bracket 48 as also shown in FIG. 4 is secured to the support 40 of the door projection below the adjustable connection 30. As shown in both FIGS. 6 and 7, the mounting bracket 48 includes an intermediate portion 54 which has an inboard flange 56 secured by a fastener 58 to the vertical wall 42 of the door projection. An outboard flange 60 of the intermediate bracket portion 54 is secured in any suitable manner to a flange 62 of the door projection support 40. A mount 64 has an inboard flange 66 secured to the inboard flange 56 and has an outboard flange 68 secured to the outboard flange 60 so as to cooperate therewith in mounting the bracket in a secure manner. Between its inboard and outboard flanges 66 and 68, a base 69 of the mount 64 has a slot 70 as shown in FIG. 6 to permit adjustment of the adjustable connection 30 as is more fully discussed below.

As best illustrated in FIG. 5, the adjustable connection 30 includes an elongated slot 72 extending laterally with respect to the vehicle door in the intermediate portion 54 of mounting bracket 48. A threaded bolt 74 of the adjustable connection 30 extends as shown in FIG. 7 from the base wall 35 of the stabilizer member 26 through the slot 72 in the intermediate bracket portion 54 and is secured by a nut 76 with its shank 78 extending through the slot 70 in mount 64. Threading and unthreading of the bolt 74 thus permits adjustment and securement of the adjustable connection 30 as the stabilizer member 26 is pivoted about the lower mounting connection 32 shown in FIG. 4 to move its upper end inwardly or outwardly as required to provide the required sealing. A pair of stop flanges 80 and 82 of the mounting bracket 48 are located at inboard and outboard locations, respectively, on opposite sides of the adjustable connection 30 provided by the bolt 74 and slot 72 of the adjustable connection. Engagement of the stabilizer member 26 with the stop flanges 80 and 82 thus limits the extremes of inward and outward adjustment of the stabilizer member 26.

As illustrated in FIG. 8, the mounting connection 32 preferably includes a threaded fastener 84 that extends between the base wall 35 of the stabilizer member 26 and the vertical wall 42 of the front projection of the door. This threaded fastener 84 has a head 86 that is engaged with the vertical wall 42 on the opposite side thereof as the stabilizer member 26. A threaded shank 88 of the fastener 84 extends from the head 86 into a threaded hole in the stabilizer member base wall 35 at a location just forward of a mounting wall 90 that engages a flange 91 of the support 40, with the flange 91 located between the stabilizer member and the vertical wall 42 to maintain the orientation of the stabilizer member with its vertical groove 28 facing rearwardly to receive the forward edge 18 of the side door window 16. At this location, the stabilizer member base wall 35 has a greater thickness than is the case above the mounting connection 32 in order to space the stabilizer member away from the vertical wall 42 and permit the pivotal adjustment under the control of the adjustable connection 30 shown in FIG. 5. It has been found that the small degree of pivoting involved can be achieved with the type of threaded fastener connection 32 illustrated in FIG. 8 even though there is no resilient member or other component specifically designed to allow such pivoting.

While the best mode for carrying out the invention has been described in detail, those familiar with the art to which this invention relates will recognize various alternative embodiments and designs for practicing the invention as defined by the following claims.

What is claimed is:

1. In a vehicle including a side door opening and a side door for opening and closing the door opening, said side door including a frameless type door window movable vertically between open and closed positions, and said side door window having front and rear vertical edges and a top edge extending between the front and rear vertical edges, a window stabilizer comprising: a molded plastic stabilizer member having a vertical groove that slidably receives one of the vertical edges of the side door window to control the path of movement and positioning thereof in the closed position; the groove of the stabilizer member converging in an upward direction and having an upper end that tapers horizontally away from the vertical edge of the side door window received by the groove; the stabilizer member being slidably engaged at the upper end of the groove with both oppositely facing surfaces of the side door window at the vertical edge thereof received by the groove; and an adjustable connection that supports the stabilizer member on the door while permitting adjustment to control the horizontal positioning of the top edge of the window in the closed position.

2. A window stabilizer as in claim 1 further including a mounting connection that supports the stabilizer member on the door in cooperation with the adjustable connection and permits pivotal movement of the stabilizer member upon adjustment of the adjustable connection to control positioning of the side door window.

3. A window stabilizer as in claim 1 wherein the side door includes a front projection that extends upwardly and supports the stabilizer member whose groove slidably receives the front vertical edge of the side door window.

4. A window stabilizer as in claim 3 wherein the mounting connection is supported on the front projection of the door below the adjustable connection.

5. A window stabilizer as in claim 4 wherein the front projection of the door includes a mounting bracket to which the adjustable connection is attached.

6. A window stabilizer as in claim 5 wherein the adjustable connection includes a slot and threaded bolt that extend between the mounting bracket and the stabilizer member.

7. A window stabilizer as in claim 6 wherein the mounting bracket includes a pair of stop flanges between which the bolt and slot of the adjustable connection are located to limit the extremes of adjustment of the stabilizer member.

8. A window stabilizer as in claim 6 wherein the mounting connection includes a threaded fastener that extends between the stabilizer member and the front projection of the door.

9. In a vehicle including a side door opening and a side door for opening and closing the door opening, said side door including a frameless type door window movable verticaly between open and closed positions, and said side door window having front and rear vertical edges and a top edge extending between the front and rear vertical edges, a window stabilizer comprising: a front projection on the door extending upwardly; a molded plastic stabilizer member having a vertical groove that slidably receives the front vertical edge of the side door window to control the path of movement and positioning thereof in the closed position; the groove of the stabilizer member conveying in an upward direction and having an upper end that tapers horizontally away from the front vertical edge of the side door window received by the groove; the stabilizer member being slidably engaged at the upper end of the groove with both oppositely facing surfaces of the side door window at the front vertical edge thereof received by the groove; and an adjustable connection that supports the stabilizer member on the front projection of the door while permitting adjustment to control the horizontal positioning of the top edge of the window in the closed position.

10. In a vehicle including a side door opening and a side door for opening and closing the door opening, said side door including a frameless type door window movable vertically between open and closed positions, and said side door window having front and rear vertical edges and a top edge extending between the front and rear vertical edges, a window stabilizer comprising: a front projection on the door extending upwardly; a molded plastic stabilizer member having a vertical groove including an upper end that converges in an upward direction and tapers horizontally in a forward direction to slidably receive and engage both oppositely facing surfaces of the front vertical edge of the side door window to control the path of movement and positioning thereof in the closed position; and an adjustable connection that supports the stabilizer member on the front projection of the door while permitting adjustment to control the horizontal positioning of the top edge of the window in the closed position.

11. In a vehicle including a side door opening and a side door for opening and closing the door opening, said side door including a frameless type door window movable vertically between open and closed positions, and said side door window having front and rear vertical edges and a top edge extending between the front and rear vertical edges, a window stabilizer comprising: a front projection on the door extending upwardly; a molded plastic stabilizer member having a vertical groove including an upper end that converges in an upward direction and tapers horizontally in a forward direction to slidably receive and engage both oppositely facing surfaces of the front vertical edge of the side door window to control the path of movement and positioning thereof in the closed position; an adjustable connection that support the stabilizer member on the door while permitting adjustment to control the horizontal positioning of the top edge of the window in the closed position; and a mounting connection supports the stabilizer member on the front projection at a location below the adjustable connection, and said mounting connection permiting pivotal movement of the stabilizer member upon adjustment of the adjustable connection to control the positioning of the side door window.

12. In a vehicle including a side door opeing and a side door for opening and closing the door opening, said side door including a frameless type door window movable vertically between open and closed positions, and said side door window having front and rear vertical edges and a top edge extending between the front and rear vertical edges, a window stabilizer comprising: a front projection on the door extending upwardly; said front projection including a mounting bracket; a molded plastic stabilizer member having a vertical groove including an upper end that converges in an upwardly direction and tapers horizontally in a forward direction to slidably receive and engage both oppositely facing surfaces of the front vertical edge of the side door window to control the path of movement and positioning thereof in the closed position; an adjustable connection including a slot and threaded both that cooperatively support the stabilizer member on the mounting bracket on the front projection of the door while permitting adjustment to control the horizontal positioning of the top edge of the window in the closed position; and a mounting connection that supports the stabilizer member on the front projection at a location below the adjustable connection, and the mounting connection permitting pivotal movement of the stabilizer member upon adjustment of the slot and bolt of the adjustable connection to control the positioning of the side door window.

13. In a vehicle including a side door opening and a side door for opening and closing the door opening, said side door including a frameless type door window movable vertically between open and closed positions, and said side door window having front and rear vertical edges and a top edge exending between the front and rear vertical edges, a window stabilizer comprising: a front projection on the door extending upwardly; said front projection including a mounting bracket having a pair of spaced stop flanges; a molded plastic stabilizer member having a vertical groove that converges in an upward direction and tapers in a forward direction to slidably receive and engage the oppositely facing surfaces of the front vertical edge of the side door window to control the path of movement and positioning thereof in the closed position; an adjustable connection including a slot and threaded bolt that cooperatively support the stabilizer member between the stop flanges of the mounting bracket on the front projection of the door while permitting adjustment to control the horizontal positioning of the top edge of the window in the closed position; and a mounting connection including a threaded fastener that supports the stabilizer member on the front projection below the adjustable connection, and the mounting connection permitting pivotal movement of the stabilizer member upon adjustment of the slot and bolt of the adjustable connection to control positioning of the side door window as limited by the stop flanges of the mounting bracket.

* * * * *

UNITED STATES PATENT AND TRADEMARK OFFICE
CERTIFICATE OF CORRECTION

PATENT NO. : 4,747,232

DATED : May 31, 1988

INVENTOR(S) : Randy L. Stephenson & Larry A. Lohr

It is certified that error appears in the above-identified patent and that said Letters Patent is hereby corrected as shown below:

Column 6, Line 48, Claim 9
"verticaly" should be --vertically--.

Column 6, Line 57, Claim 9
after "member" change "conveying" to --converging--.

Column 7, Line 35, Claim 11
"support" should be --supports--.

Column 7, Line 38, Claim 11
after "connection" insert --that--.

Column 8, Line 4, Claim 12
"upwardly' should be --upward--.

Column 8, Line 9, Claim 12
"both" should be --bolt--.

Signed and Sealed this

Fourth Day of April, 1989

Attest:

DONALD J. QUIGG

Attesting Officer

Commissioner of Patents and Trademarks